(12) United States Patent
Kimura

(10) Patent No.: US 11,428,864 B2
(45) Date of Patent: Aug. 30, 2022

(54) OPTICAL WAVEGUIDE AND OPTICAL DEVICE

(71) Applicant: FUJITSU LIMITED, Kawasaki (JP)

(72) Inventor: Tokuharu Kimura, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/340,713

(22) Filed: Jun. 7, 2021

(65) Prior Publication Data

US 2022/0066093 A1    Mar. 3, 2022

(30) Foreign Application Priority Data

Aug. 27, 2020 (JP) .............................. JP2020-143393

(51) Int. Cl.
    *G02B 6/02*     (2006.01)
    *G02B 6/293*    (2006.01)
    *G02B 6/12*     (2006.01)

(52) U.S. Cl.
    CPC ....... *G02B 6/02204* (2013.01); *G02B 6/2934* (2013.01); *G02B 2006/12061* (2013.01); *G02B 2006/12121* (2013.01)

(58) Field of Classification Search
    CPC .............. G02B 6/02204; G02B 6/2934; G02B 2006/12061; G02B 2006/12121
    See application file for complete search history.

(56) References Cited

U.S. PATENT DOCUMENTS

| | | | | |
|---|---|---|---|---|
| 6,845,205 B2* | 1/2005 | Takagi | .................. | H01S 5/0422 |
| | | | | 257/623 |
| 10,197,730 B1* | 2/2019 | Ngu | .................. | G02B 6/12002 |
| 2004/0190848 A1* | 9/2004 | Ide | .................. | G02B 6/132 |
| | | | | 385/129 |
| 2013/0058371 A1* | 3/2013 | Yoneda | .................. | H01S 5/2275 |
| | | | | 372/50.11 |
| 2015/0253510 A1* | 9/2015 | Celo | .................... | G02B 6/3576 |
| | | | | 385/14 |
| 2017/0045689 A1* | 2/2017 | Zhang | .................... | G02F 1/025 |
| 2019/0123233 A1 | 4/2019 | Usami | | |
| 2021/0373233 A1* | 12/2021 | Tanaka | ...................... | G01J 1/58 |

FOREIGN PATENT DOCUMENTS

| | | |
|---|---|---|
| JP | 5-188227 A | 7/1993 |
| JP | 2004-301911 A | 10/2004 |
| JP | 2019-40099 A | 3/2019 |
| JP | 2019-75513 A | 5/2019 |

OTHER PUBLICATIONS

Jung, C.O., et al., "Advanced plasma technology in microelectronics", Thin Solid Films 341, pp. 112-119 (1999).

Furuse, T., et al., "Thermal annealing effects on electric properties of PECVD-SiO2 films", Proceedings of College of Science and Technology Academic Lecture, Nihon University, pp. 247-248 (2012).

* cited by examiner

*Primary Examiner* — Ellen E Kim
(74) *Attorney, Agent, or Firm* — ArentFox Schiff LLP

(57) ABSTRACT

An optical waveguide includes a core, a first cladding, a second cladding, and a heater. The first cladding configured to cover the core. The second cladding disposed over the first cladding. The heater disposed over the second cladding to heat the core. The first cladding and the second cladding are silicon oxide films. A first fixed charge density of the first cladding is lower than a second fixed charge density of the second cladding.

8 Claims, 17 Drawing Sheets

OPTICAL WAVEGUIDE AND OPTICAL DEVICE

CROSS-REFERENCE TO RELATED APPLICATION

This application is based upon and claims the benefit of priority of the prior Japanese Patent Application No. 2020-143393, filed on Aug. 27, 2020, the entire contents of which are incorporated herein by reference.

FIELD

The embodiments discussed herein are related to an optical waveguide and an optical device.

BACKGROUND

Silicon photonics in which optical devices are integrated over a silicon substrate has been attracting attention. In many cases, the optical devices over the silicon substrate are achieved by an optical waveguide in which a silicon thin wire is covered with a silicon oxide film (hereinafter, referred to as a silicon optical waveguide). The silicon oxide film that covers the silicon thin wire is referred to as an upper cladding layer.

The upper cladding layer is formed by, for example, plasma chemical vapor deposition (CVD) using tetraethyl orthosilicate tetraethoxysilane (TEOS) as a raw material gas. The Plasma CVD using the TEOS as the raw material gas is suitable for forming the upper cladding layer since a film forming rate is fast.

A silicon oxide film (hereinafter, referred to as a TEOS film) formed by using the TEOS by the plasma CVD absorbs moisture (for example, absorbs humidity) immediately after the forming of the film is completed. Since a refractive index of the upper cladding layer formed by using the TEOS film changes due to the humidity absorption, element properties of the optical device including the TEOS film change with time. For example, a resonance wavelength of a ring resonator having a ring-shaped silicon thin wire changes with time due to humidity absorption of the upper cladding layer (for example, TEOS film).

Thus, a technique for suppressing a temporal change in the refractive index of the upper cladding layer by using a $SiO_2$ film and a silicon nitride film (so-called SiN film) of which a content of moisture (or OH group, the same applies later) is low has been proposed. For example, a silicon oxide film (hereinafter, referred to as an LPCVD film) formed by low pressure chemical vapor deposition (LPCVD) using silane as a raw material gas and a SiN film are used. The LPCVD film is an $SiO_2$ film having a moisture content less than the moisture content of the TEOS film. The SiN film is a thin film that is unlikely to transmit moisture.

Due to the use of these characteristics, an optical waveguide including a core, an LPCVD film that covers the core, a SiN film over the LPCVD film, a TEOS film over the SiN film, and a SiN film over the TEOS film has been proposed.

The SiN film over the LPCVD film suppresses diffusion of moisture in the TEOS film to the vicinity of the core. The SiN film over the TEOS film suppresses the humidity absorption of the TEOS film. Since a variation in the moisture content of the upper cladding (here, the LPCVD film and the TEOS film) is suppressed by these two SiN films, a change in the refractive index of the upper cladding layer is also suppressed. According to this technique, a temporal change in the element properties of the optical device (for example, the resonance wavelength of the ring resonator) may be suppressed.

A plurality of optical devices related to the above technique has been reported. For example, an optical waveguide having a SiN film between a core layer of $SiO_2$ and a cladding layer of $SiO_2$ has been reported. A technique for annealing a boro-phospho-silicate glass (BPSG) film or the like which becomes a lower cladding layer in order to remove moisture and carbon has been reported. A technique for forming a TEOS film over an LPCVD film that covers an optical waveguide has been reported.

Related arts are disclosed in for example Japanese Laid-open "Advanced plasma technology in microelectronics" (C. O. Jung, K. K Chi, B. G Hwang, J. T Moon, M. Y Lee, J. G Lee), Thin Solid Films 341, pp. 112-119 (1999), and "Thermal annealing effects on electric properties of $PECVD-SiO_2$ films" (Tatsuya Furuse, Kotaro Satou, Owase Tomoaki, Yosuke Hasegawa, Yoshihiro Takahasi), Proceedings of College of Science and Technology Academic Lecture, 2012.

SUMMARY

According to an aspect of the embodiments, an optical waveguide includes: a core; a first cladding configured to cover the core; a second cladding disposed over the first cladding; and a heater disposed over the second cladding to heat the core, wherein the first cladding and the second cladding are silicon oxide films, and a first fixed charge density of the first cladding is lower than a second fixed charge density of the second cladding.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The element properties of the optical device over the silicon substrate (for example, the optical device for the silicon photonics) are controlled by a thermo-optical effect of silicon. For example, the resonance wavelength of the ring resonator is controlled by heating the silicon thin wire core. The optical device of which the element properties are controlled by the thermo-optical effect includes an optical waveguide (hereinafter, referred to as an optical waveguide with a heater) in which a heater is provided above the silicon thin wire core.

The inventor has found that the temporal change in the element properties (for example, the resonance wavelength of the ring resonator) of the optical device including the optical waveguide with the heater may not be suppressed by the above-described technique (the use of the $SiO_2$ film and the SiN film having the small amount of moisture). Thus, an object of the present disclosure is to solve such a problem.

Hereinafter, embodiments of the present disclosure will be described with reference to the drawings. However, the technical scope of the present disclosure is not limited to these embodiments, and extends to matters described in the claims and equivalents thereof. Parts and the like having an identical structure in different drawings are denoted by identical reference signs, and description thereof is omitted.

First Embodiment (1) Structure

Figure 1:
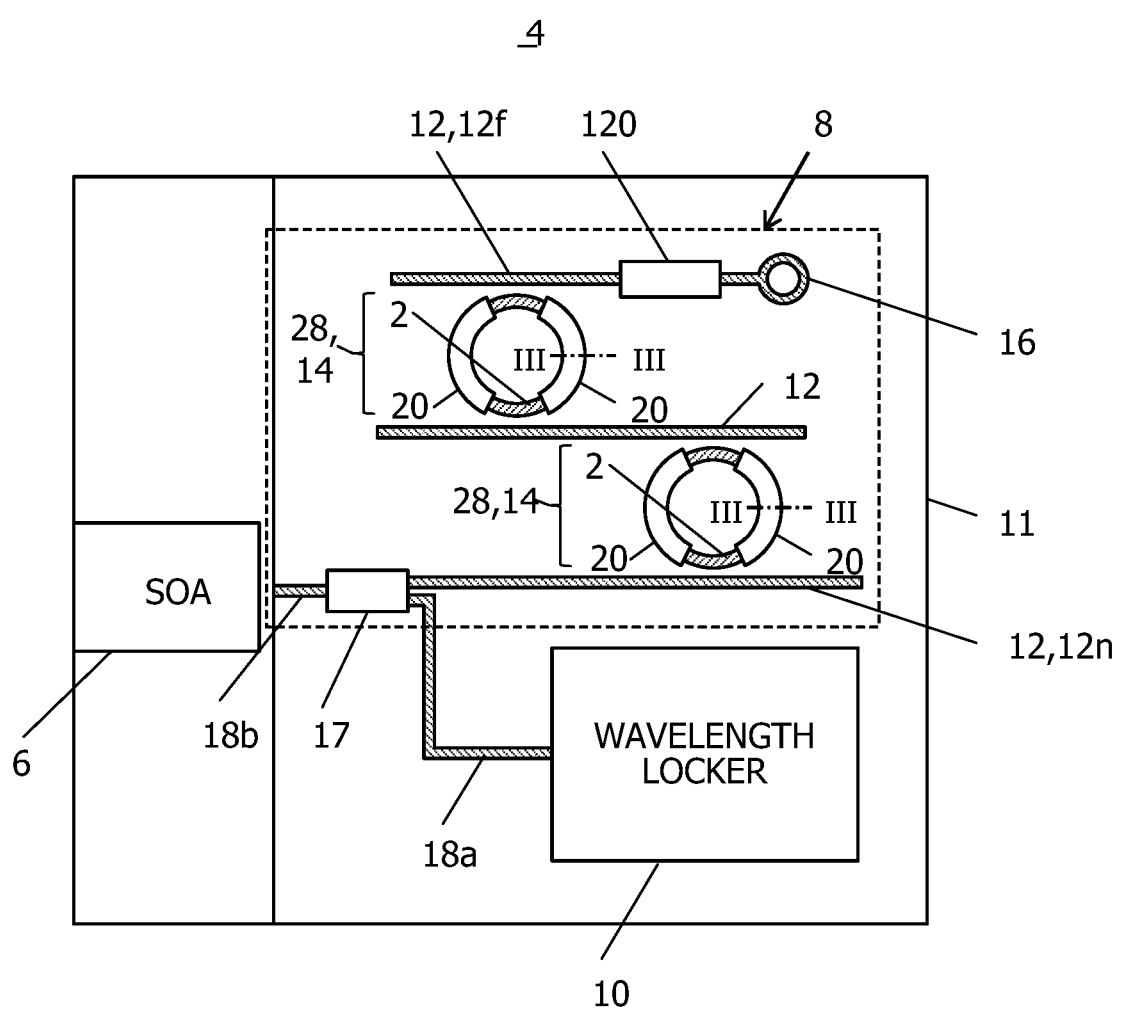
FIG. 1 is a plan view illustrating an example of a wavelength tunable laser including an optical waveguide according to a first embodiment.

FIG. 1 is a plan view illustrating an example of a wavelength tunable laser 4 including an optical waveguide 2 according to a first embodiment. The wavelength tunable laser 4 includes a semiconductor optical amplifier (SOA) 6, a wavelength tunable filter 8, a wavelength locker 10, and an optical waveguide 18a that couples the wavelength tunable filter 8 and the wavelength locker 10 to each other. The SOA 6 and the wavelength tunable filter 8 form a laser resonator.

The wavelength tunable filter 8 and the wavelength locker 10 are provided over a silicon substrate 11. The SOA 6 is disposed in a recess formed in the silicon substrate 11. An antireflective coating is provided on an end surface of the SOA 6 close to the wavelength tunable filter 8, and a reflection film having a reflectance of, for example, tens of percentages is provided on the other end surface of the SOA 6. The reflection film may not be provided on the other end surface of the SOA 6.

—Wavelength Tunable Filter 8—

The wavelength tunable filter 8 includes three linear optical waveguides 12 arranged in parallel and two ring resonators 14 arranged one by one between the three optical waveguides 12. The two ring resonators 14 are optical devices including the optical waveguides 2 having ring-shaped cores 28, respectively. When the ring resonator 14 is used alone, the ring resonator 14 may have two optical waveguides (an input optical waveguide and an output optical waveguide) in proximity to the optical waveguide 2.

Figure 2:
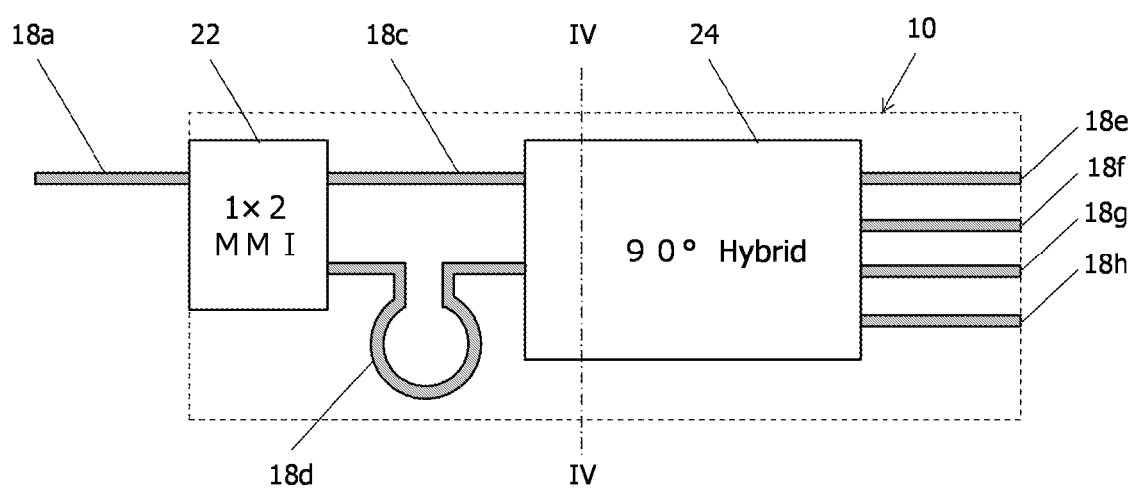
FIG. 2 is a plan view illustrating an example of a wavelength locker.

When a member (for example, the optical waveguide 12) to which a lead-out line is attached has a core, a pointed end of the lead-out line in FIG. 1 is attached to the core (the same applies to lead-out lines in FIG. 2 and the like). A shape illustrated as a shape (for example, linear shape) of the member to which the lead-out line is attached means a shape of the core.

The wavelength tunable filter 8 further includes a loop mirror 16 coupled to an optical waveguide 12f farthest from the SOA 6 among the three optical waveguides 12 and an optical splitter 17 coupled to an optical waveguide 12n closest to the SOA 6 among the three optical waveguides. An output end of the optical splitter 17 is coupled to the optical waveguide 12n and the above-described optical waveguide 18a.

The wavelength tunable filter 8 further includes an optical waveguide 18b having one end coupled to an input end of the optical splitter 17. The other end of the optical waveguide 18b is optically coupled to the SOA 6 with a slight gap therebetween.

Heaters 20 that control refractive indices of the cores 28 of the optical waveguides 2 by a thermo-optical effect are provided in the optical waveguides 2 of the two ring resonators 14, respectively. One end of the heater 20 is coupled to, for example, a first electrode provided on a surface of the wavelength tunable laser 4 via a first lead-out wiring. The first electrode and the first lead-out wire are not illustrated in FIG. 1.

The other end of the heater 20 is coupled to a second electrode provided on the surface of the wavelength tunable laser 4 via a second lead-out wiring. The second electrode and the second lead-out wire are not illustrated in FIG. 1.

When current flows to the heater 20 via the first electrode and the second electrode, the heater 20 generates heat, and the core of the optical waveguide 2 is heated. As a result, a temperature of the core of the optical waveguide 2 rises, and a refractive index of the core of the optical waveguide 2 changes. Accordingly, the refractive index of the core of the optical waveguide 2 may be controlled by adjusting the current flowing to the heater 20.

By the control of the refractive index, resonance wavelengths of the two ring resonators 14 are adjusted to slightly differ from each other, and a wide free spectral range (FSR) and a wavelength tunable function (function of adjusting a selected wavelength to be described later) are achieved by a Vernier effect.

The two ring resonators 14 and the three optical waveguides 12 extract light (hereinafter, referred to as selected light) having a particular wavelength (hereinafter, referred to as a selected wavelength) from light incident on the optical waveguide 18b from the SOA 6 and input the selected light to the loop mirror 16 in cooperation with each other. The loop mirror 16 reverses a traveling direction of the input selected light. The selected light of which the traveling direction is reversed moves along a path through which the selected light has propagated in an opposite direction, and is incident on the SOA 6.

The selected light incident on the SOA 6 is amplified, is reflected from the end surface (the end surface of the SOA 6: hereinafter, referred to as an output end surface) opposite to the optical waveguide 18b, and is incident on the optical waveguide 18b of the wavelength tunable filter 8 again. The selected light grows while reciprocating between the wavelength tunable filter 8 and the SOA 6, and becomes a laser beam. This laser beam is output from the output end surface of the SOA 6.

A heater 120 for adjusting a phase of the selected light by the thermo-optical effect is provided in the vicinity of the loop mirror 16 of the optical waveguide 12f. The optical splitter 17 splits a part of the selected light and inputs the split part of the selected light to the wavelength locker 10 via the optical waveguide 18a.

—Wavelength Locker 10—

FIG. 2 is a plan view illustrating an example of the wavelength locker 10.

The wavelength locker 10 includes, for example, a 1×2 multi-mode interferometer (MMI) 22, an optical waveguide 18c, a delay waveguide 18d, a 90° hybrid 24, and four output optical waveguides 18e, 18f, 18g, and 18h. The 90° hybrid 24 is, for example, a 2×4 MMI. The optical waveguide 18c and the delay waveguide 18d are coupled to an input port of the 90° hybrid 24. The output optical waveguides 18e, 18f, 18g, and 18h are coupled to an output port of the 90° hybrid 24. The output optical waveguides 18e and 18f are coupled to different photodetectors (not illustrated), respectively.

Light (hereinafter, referred to as input light) input to the wavelength locker 10 via the optical waveguide 18a is split by the 1×2 MMI 22. One of the split input light beams is input to the 90° hybrid 24 via the optical waveguide 18c, and the other input light beam is input to the 90° hybrid 24 via the delay waveguide 18d.

The 90° hybrid 24 outputs interference light beams having phases different from each other by 90° via the output optical waveguides 18e and 18f. These two interference light beams are output light beams from the wavelength locker 10. Light intensity of the interference light is measured by each of the photodetectors coupled to the output optical waveguides 18e and 18f.

The light intensity of each interference light changes periodically with respect to a wavelength A of the above input light, and becomes maximal when the wavelength A is a particular wavelength. Accordingly, the wavelength of the laser beam may be precisely controlled by controlling the heater 20 such that a ratio between the intensity of the interference light output from one of the output optical waveguides 18e and 18f and the intensity of the laser beam output from the wavelength tunable laser 4 is fixed. From which of the output optical waveguides 18e and 18f the interference light output may be appropriately selected depending on a positional relationship between a peak wavelength of the interference light and the wavelength of the laser beam.

—Sectional Structure of Optical Waveguide 2—

Figure 3:
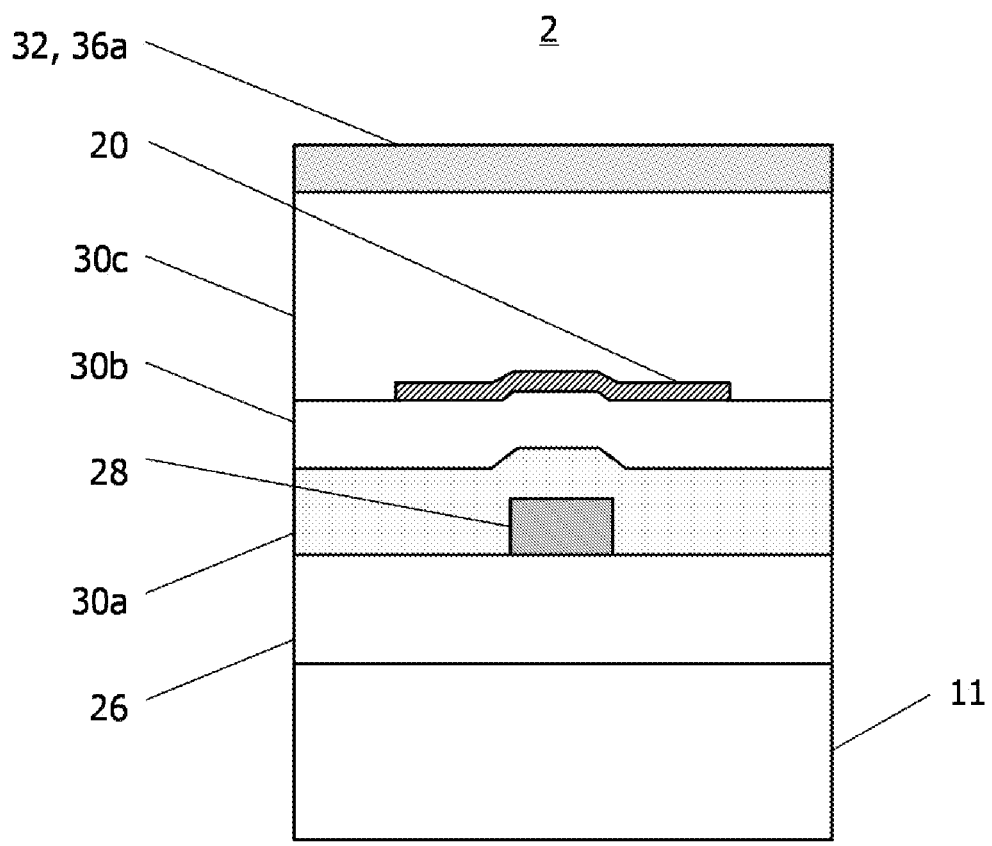
FIG. 3 is an example of a sectional view of the optical waveguide taken along a line III-III in FIG. 1.

FIG. 3 is an example of a sectional view of the optical waveguide 2 taken along a line III-III in FIG. 1.

The optical waveguide 2 is provided, for example, over a silicon oxide film 26 in contact with the silicon substrate 11. The silicon substrate 11 is, for example, a support substrate of a silicon on insulator (SOI) substrate. The silicon oxide film 26 is, for example, a buried oxide (BOX) layer of the SOI substrate.

The optical waveguide 2 includes the core 28, a first cladding 30a that covers the core 28, a second cladding 30b disposed over the first cladding 30a, and the heater 20 disposed over the second cladding 30b and heating the core 28.

The optical waveguide 2 further includes a third cladding 30c that covers the second cladding 30b and the heater 20, and a passivation film 32 disposed over the third cladding 30c. The heater 20 is, for example, a thin film resistor.

The core 28 is a thin silicon wire. The first to third claddings 30a, 30b, and 30c are silicon oxide films. The first to third claddings 30a, 30b, and 30c and the silicon oxide film 26 form a cladding surrounding the core 28 (for example, the core of the optical waveguide 2). The passivation film 32 is preferably a silicon nitride film (hereinafter, referred to as a first silicon nitride film).

The first cladding 30a is a silicon oxide film having a fixed charge density lower than those of the second cladding 30b and the third cladding 30c. The fixed charge density of the first cladding 30a is preferably less than $5 \times 10^{11}$ cm$^{-2}$ (see "(3) Suppression of Temporal Change" below). The fixed charge density of the first cladding 30a is more preferably less than $4 \times 10^{11}$ cm$^{-2}$, and most preferably less than $3 \times 10^{11}$ cm$^{-2}$.

The fixed charge densities of the second cladding 30b and the third cladding 30c are preferably $1 \times 10^{13}$ cm$^{-2}$ or less (see "(3) Suppression of Temporal Change" below). The fixed charge densities of the second cladding 30b and the third cladding 30c are more preferably $8 \times 10^{12}$ cm$^{-2}$ or less, and most preferably $6 \times 10^{12}$ cm$^{-2}$ or less. The fixed charge density of the silicon oxide film may be measured by, for example, a capacitance-voltage method (CV method).

The first cladding 30a is, for example, high-density-plasma undoped-silicate-glass (HDP-USG) heat-treated in oxygen. The HDP-USG is a silicon oxide film formed by HDP-CVD. The HDP-CVD is a type of plasma CVD for forming a thin film from plasma of a raw material gas. The second cladding 30b and the third cladding 30c are formed by, for example, plasma CVD from a mixed gas containing TEOS and oxygen.

A thickness of the core 28 is preferably 100 nm to 400 nm (for example, 220 nm). A thickness of the first cladding 30a is preferably 100 nm to 500 nm (for example, 280 nm), and more preferably 220 nm to 400 nm. A thickness of the second cladding 30b is preferably 100 nm to 500 nm (for example, 300 nm), and more preferably 200 nm to 400 nm.

In the example illustrated in FIG. 1, the core 28 is an annular semiconductor layer (for example, a silicon layer). The ring resonator 14 is an optical device that resonates light having a particular wavelength that travels around the core 28.

In the example illustrated in FIG. 1, the optical waveguide 2 is an optical waveguide included in the ring resonator 14. However, the optical waveguide 2 according to the first embodiment is not limited to the optical waveguide included in the ring resonator. For example, the optical waveguide 12f in which the heater 120 is provided (see FIG. 1) is another example of the optical waveguide 2 according to the first embodiment.

—Sectional Structure of Wavelength Locker 10—

Figure 4:
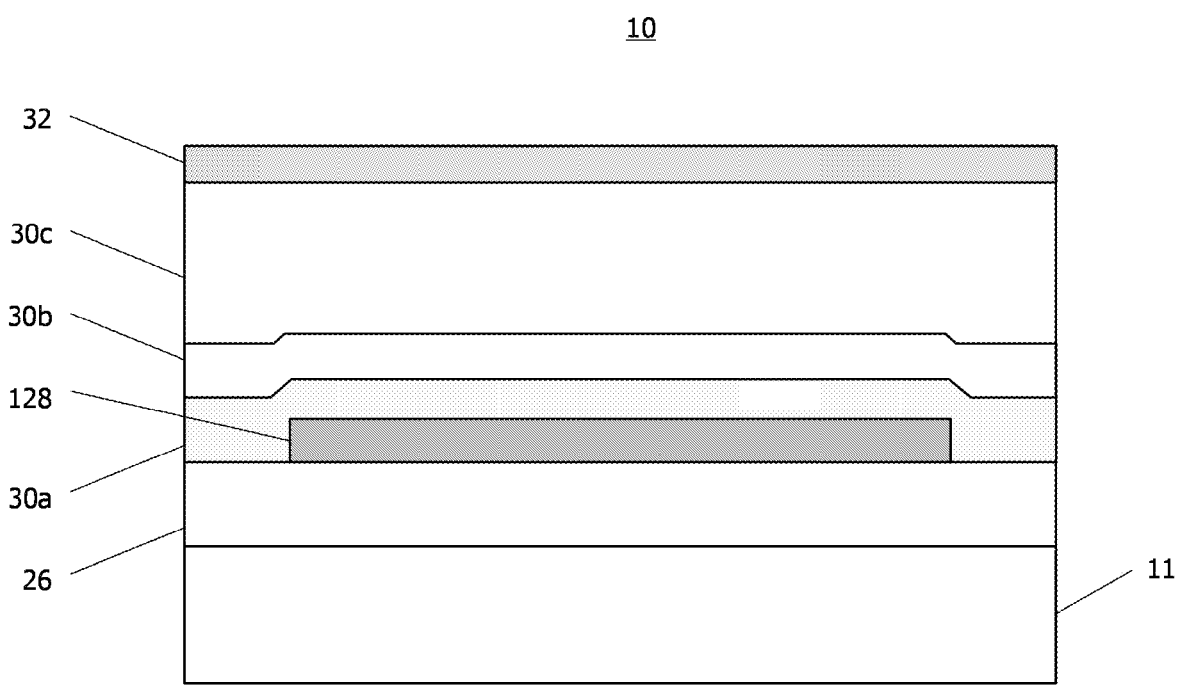
FIG. 4 is an example of a sectional view of the wavelength locker taken along a line IV-IV in FIG. 2.

FIG. 4 is an example of a sectional view of the wavelength locker 10 taken along a line IV-IV in FIG. 2. A sectional structure of the wavelength locker 10 is substantially identical to the structure of the optical waveguide 2 described with reference to FIG. 3 except that the heater 20 is not provided and a width of the core 128 is wider than the width of the core 28 of the optical waveguide 2.

For example, the wavelength locker 10 includes another core 128 different from the core 28 of the optical waveguide 2, the first to third claddings 30a to 30c, and the passivation film 32. In the example illustrated in FIG. 2, the core 128 of the wavelength locker 10 includes the cores of 1×2 MMI 22, the optical waveguide 18c, the delay waveguide 18d, the 90° hybrid 24, and the four output optical waveguides 18e, 18f, 18g, and 18h.

The first cladding 30a also covers the core 128 of the wavelength locker 10 in addition to the core 28 of the optical waveguide 2. Similarly, the second cladding 30b also covers the core 128 of the wavelength locker 10 via the first cladding 30a in addition to the core 28 of the optical waveguide 2.

The input light of the wavelength locker 10 is input to the core of the 1×2 MMI 22 in the core 128. On the other hand, the output light of the wavelength locker 10 is output from the cores of the output optical waveguides 18e and 18f (see FIG. 2) in the core 128.

(2) Manufacturing Method

FIGS. 5A to 10 are diagrams illustrating an example of a method of manufacturing the optical waveguide 2.

—Forming of Core 28 (See FIG. 5A)—

Figure 5A:
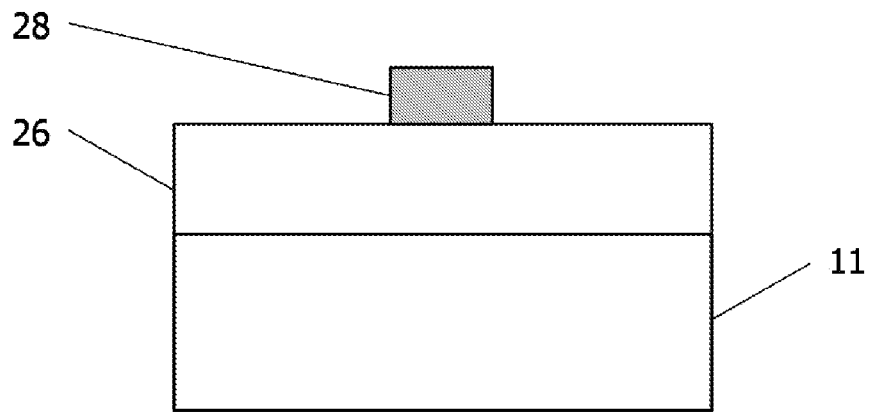
FIGS. 5A to 5C are diagrams illustrating an example of a method for manufacturing the optical waveguide.

First, a single crystal Si layer over the BOX layer 26 of the SOI substrate is processed by photolithography and reactive ion etching (RIE) to form the core 28 (see FIG. 5A). At this time, the core 128 (see FIG. 4) of the wavelength locker 10 and the like are also formed together.

—Forming of First Cladding 30a (See FIGS. 5B and 5C)—

Figure 5B:
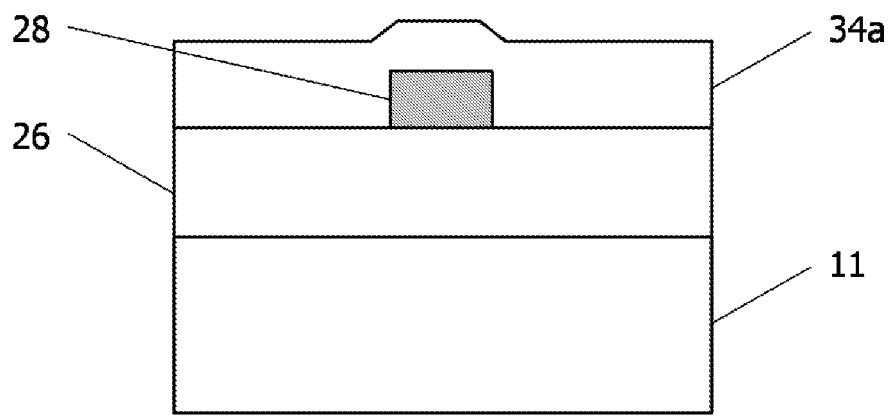
Figure 5C:
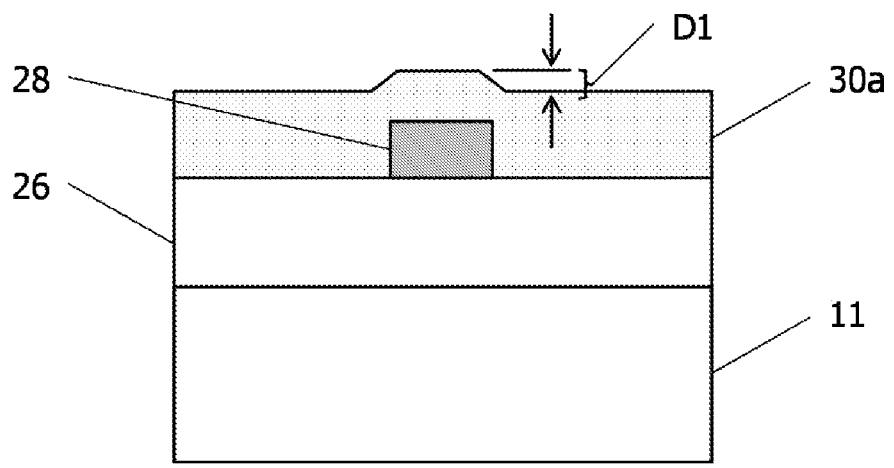

For example, a silicon oxide film 34a (hereinafter, referred to as a first silicon oxide film) that covers the core 28 is formed from a mixed gas containing silane and oxygen by the HDP-CVD (see FIG. 5B). For example, an example of the first silicon oxide film 34a is a film formed by HDP-USG (hereinafter, referred to as an HDP-USG film). The above mixed gas may contain argon. The first silicon oxide film 34a may be a silicon oxide film (for example, silicon oxide film formed by LPCVD) other than the HDP-USG film.

The formed first silicon oxide film 34a is heat-treated in an oxygen atmosphere (for example, in oxygen) at, for example, 200° C. to 600° C. for 30 minutes to 120 minutes (for example, 60 minutes). By this heat treatment, the first silicon oxide film 34a becomes the first cladding 30a (see FIG. 5C). The heat treatment temperature is preferably equal to or higher than the heating temperature (for example, 100° C. to 180° C.) of the core 28 by the heater 20.

The heat treatment temperature is not limited to the above temperature. The heat treatment temperature may be, for example, 300° C. to 500° C. Similarly, the heat treatment time may be 50 minutes to 90 minutes.

As is well known, a silicon oxide film (for example, HDP-USG film) formed by the plasma CVD includes a large number of oxygen vacancies. The heat treatment in the oxygen reduces the oxygen vacancies in the silicon oxide film. When the oxygen vacancies in the silicon oxide film are reduced by the heat treatment in the oxygen, the fixed charge density of the silicon oxide film is also reduced (see, for example, "Thermal annealing effects on electric properties of PECVD-SiO$_2$ films" (Tatsuya Furuse, Kotaro Satou, Owase Tomoaki, Yosuke Hasegawa, Yoshihiro Takahasi), Proceedings of College of Science and Technology Academic Lecture, Nihon University, 2012, p. 247).

—Forming of Second Cladding 30b (See FIG. 6A)—

For example, a silicon oxide film 34b (hereinafter, referred to as a second silicon oxide film) that covers the first cladding 30a is formed by the plasma CVD from a mixed gas containing TEOS and oxygen (see FIG. 6A). As described above, the first cladding 30a is the heat-treated first silicon oxide film 34a.

The second silicon oxide film 34b is the second cladding 30b. The second silicon oxide film 34b is a TEOS film (the same applies to a third silicon oxide film 34c and a fourth silicon oxide film 34d to be described later).

—Forming of Heater 20 (See FIG. 6B)—

A metal film (for example, TiN/Ti stacked film) which becomes the heater 20 is deposited over the second cladding 30b (for example, the second silicon oxide film 34b). The deposited metal film is processed by the photolithography and the RIE to form the heater 20 above the core 28.

—Forming of Third Cladding 30c (See FIGS. 7A and 7B and FIG. 9)—

Figure 7A:
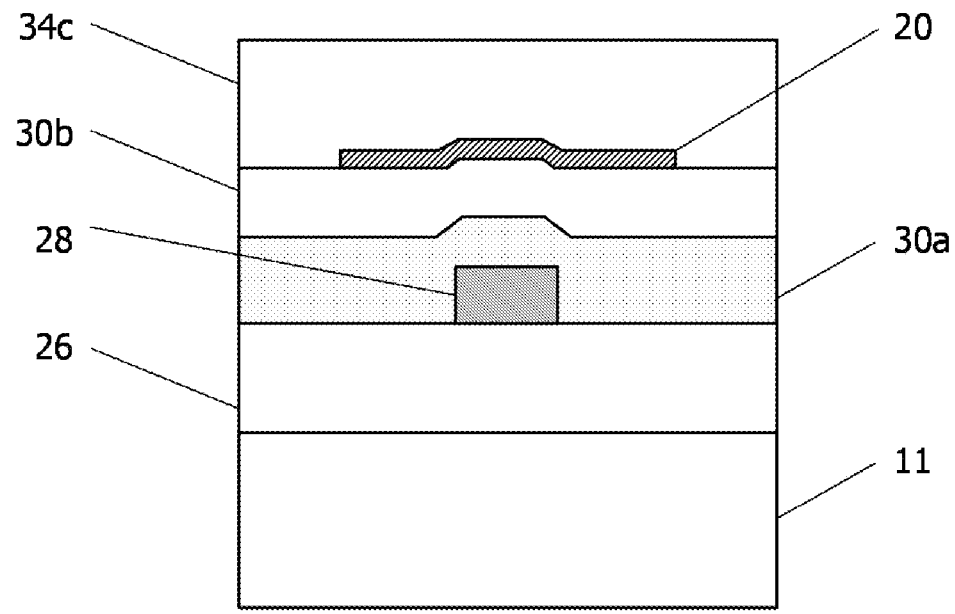
FIGS. 7A and 7B are diagrams illustrating an example of the method for manufacturing the optical waveguide.
Figure 7B:
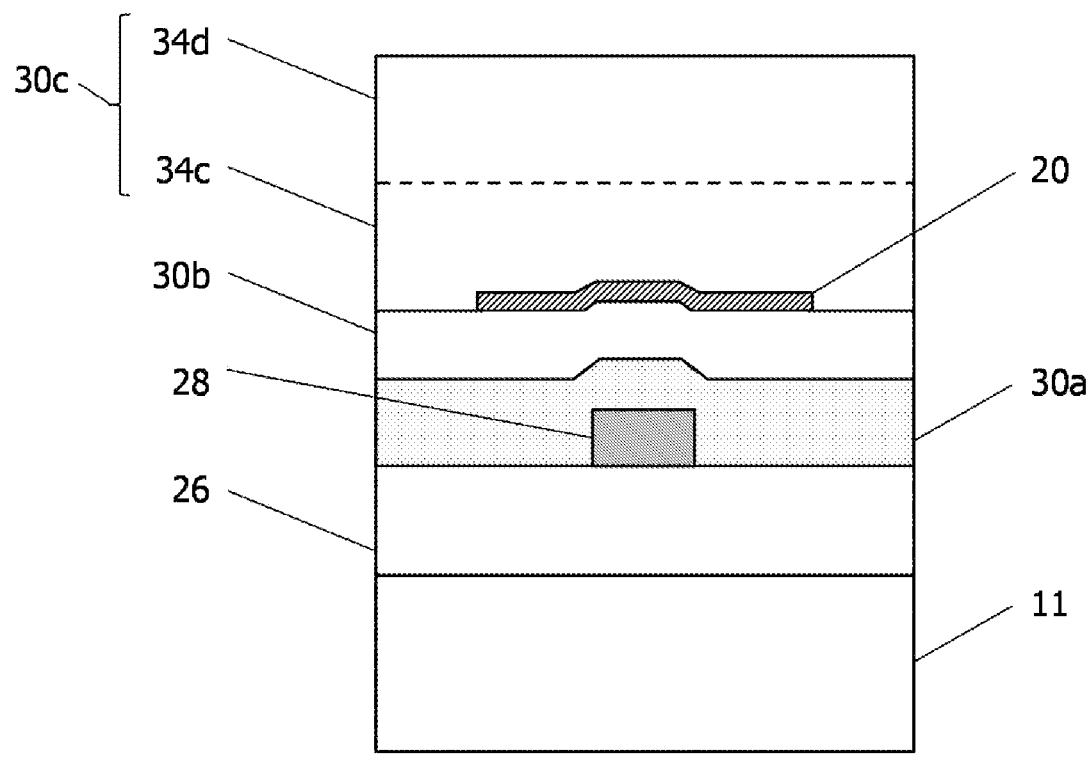
Figure 8:
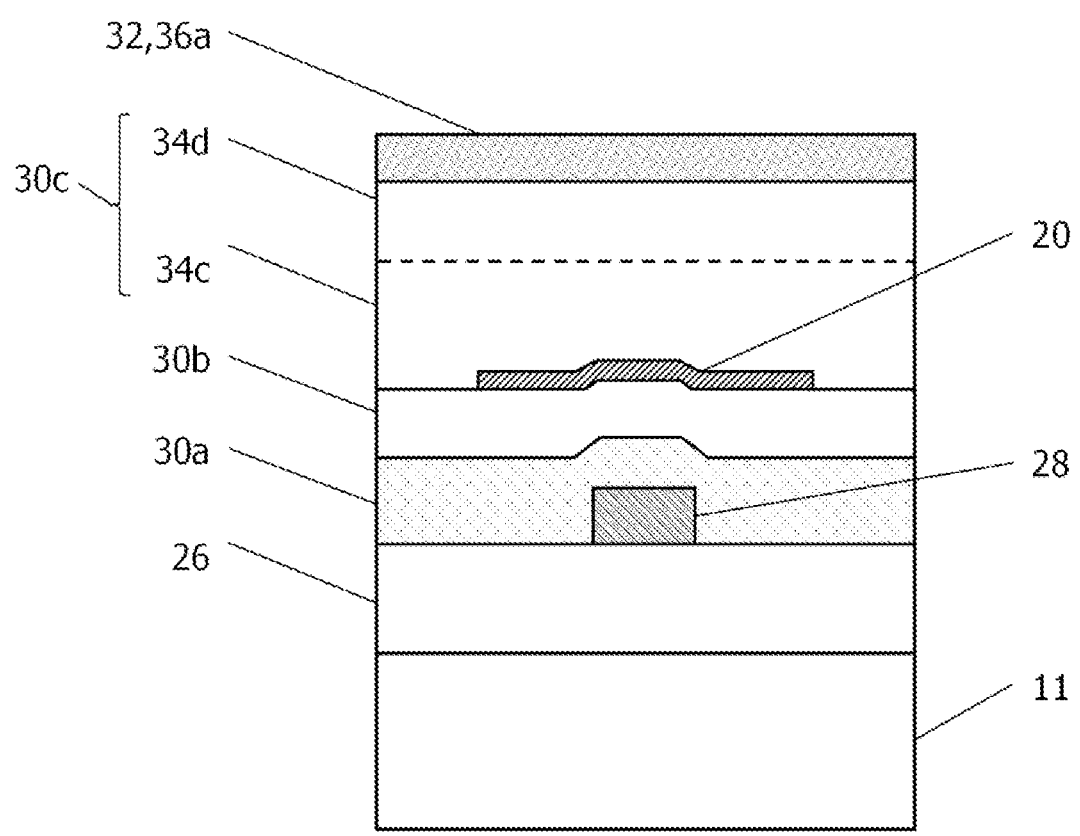
FIG. 8 is a diagram illustrating an example of the method for manufacturing the optical waveguide.

For example, the silicon oxide film 34c (hereinafter, referred to as a third silicon oxide film) that covers the third cladding 30b and the heater 20 is formed by the plasma CVD from a mixed gas containing TEOS and oxygen (see FIG. 7A). Thereafter, two vias V1 and V2 that penetrate through the third silicon oxide film 34c (see FIG. 9) and reach both ends of the heater 20 are formed.

Figure 9:
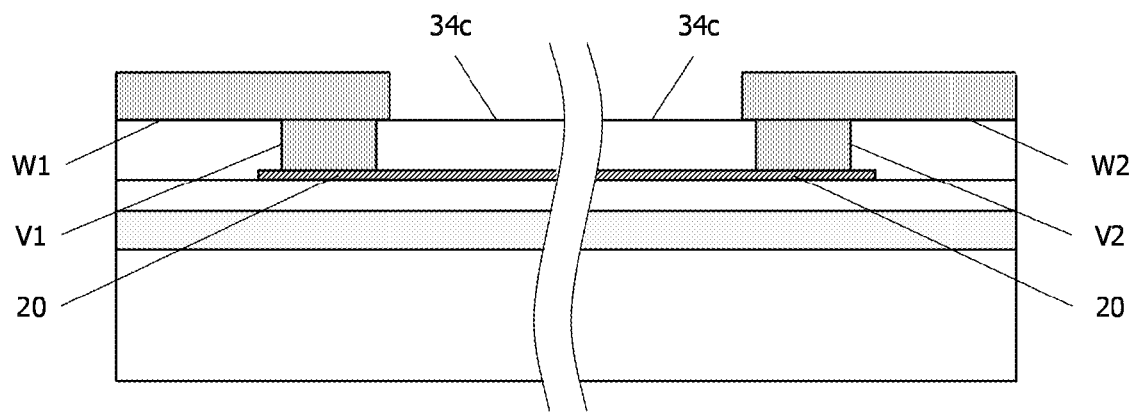
FIG. 9 is a diagram illustrating an example of the method for manufacturing the optical waveguide.
Figure 10:
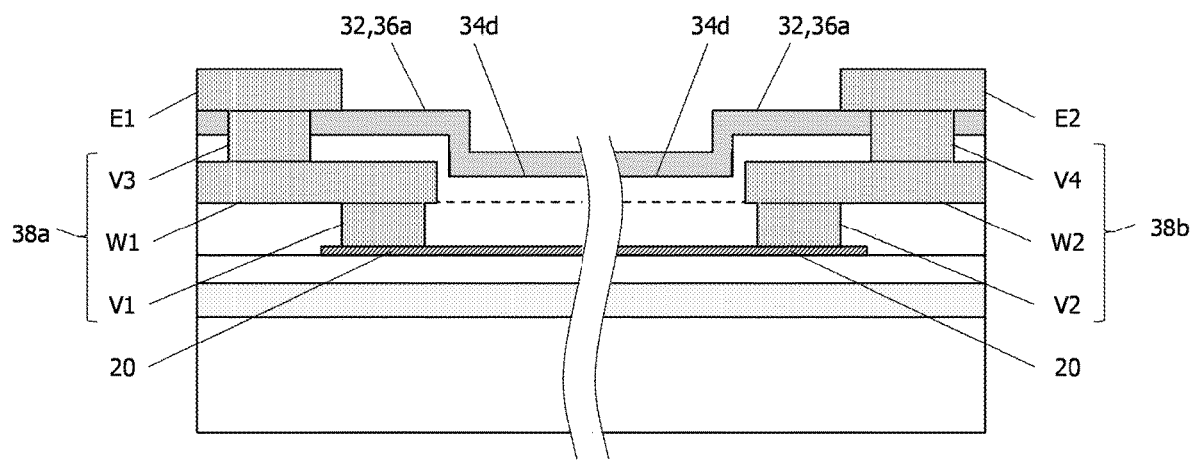
FIG. 10 is a diagram illustrating an example of the method for manufacturing the optical waveguide.

FIG. 9 illustrates the vicinity of both the ends of the heater 20 (the same applies to FIG. 10). On the other hand, FIGS. 5A to 8 illustrate a central portion of the heater 20. One of the two vias (hereinafter, referred to as a first via V1) is coupled to one end of the heater 20, and the other via (hereinafter, referred to as a second via V2) is coupled to the other end of the heater 20.

Thereafter, a first wiring W1 coupled to the first via V1 and a second wiring W2 coupled to the second via V2 are formed over the third silicon oxide film 34c. The silicon oxide film 34d (see FIG. 7B: hereinafter, referred to as a fourth silicon oxide film 34d) is formed over the third silicon oxide film 34c over which the first and second wiring W1 and W2 are formed from a mixed gas containing, for example, TEOS and oxygen by the plasma CVD. A stacked film of the third silicon oxide film 34c and the fourth silicon oxide film 34d is the third cladding 30c (see FIG. 7B).

—Forming of Passivation Film 32 (See FIG. 8)—

A first silicon nitride film 36a (for example, SiN film) is formed over the fourth silicon oxide film 34d from, for example, a mixed gas of silane and ammonia by the plasma CVD. The first silicon nitride film 36a is the passivation film 32.

The first to fourth silicon oxide films 34a to 34d are, for example, silicon oxide films (so-called SiO$_2$ films) of which an atomic number ratio of silicon and oxygen is about 1:2.

—Forming of Electrode (See FIG. 10)—

A third via V3 coupled to the first wiring W1 and a fourth via V4 coupled to the second wiring W2 are formed to penetrate through the passivation film 32 (see FIG. 10) and the fourth silicon oxide film 34d. Thereafter, a first electrode E1 coupled to the third via and a second electrode E2 coupled to the fourth via are formed over the passivation film 32.

The first via V1, the first wiring W1, and the third via V3 form a first lead-out wiring 38a that couples one end of the heater 20 and the first electrode E1 to each other. The second via V2, the second wiring W2, and the fourth via V4 form a second lead-out wiring 38b that couples the other end of the heater 20 and the second electrode E2 to each other.

The first via V1 and the first wiring W1 may be a single electrode that is integrally formed (the same is applied to the second via V2, the second wiring W2, and the like).

Finally, the SOA 6 is disposed in the recess formed in advance in the SOI substrate.

Meanwhile, since a dense silicon oxide film (hereinafter, referred to as a high-density silicon oxide film) such as the HDP-USG film is inferior in flatness, a large level difference D1 (hereinafter, referred to as a first level difference) is generated on a surface of the first cladding 30a (see FIG. 5C) close to the heater 20 due to the core 28.

The TEOS film is superior to the HDP-USG film in flatness. Accordingly, a level difference D2 (hereinafter, referred to as a second level difference) generated on a surface of the second cladding 30b (see FIG. 6A) close to the heater 20 due to the core 28 is lower than the first level difference D1 (see FIG. 5C) generated in the first cladding 30a due to the core 28. Since the second cladding 30b is a base of the heater 20 (see FIG. 6B), disconnection of the heater 20 is unlikely to occur due to the low level difference D2 (<D1) of the second cladding 30b. The first level difference D1 and the second level difference D2 are level differences positioned above the core 28.

Accordingly, according to the first embodiment, the reliability of the heater 20 increases. For example, the reliability when the heater is used for a long period (for example, long-term reliability) increases.

(3) Suppression of Temporal Change

In many cases, an upper cladding of the silicon optical waveguide (for example, a silicon oxide film that covers a silicon core) is formed by using a TEOS film having a high film forming rate. The TEOS film is an oxide film having a low film density and high hygroscopicity.

The TEOS film absorbs moisture in the air immediately after the film is formed, and a refractive index increases. When the TEOS film having the absorbed humidity is heated, the absorbed moisture is discharged, and the refractive index decreases.

When the core 28 of the ring resonator 14 (see FIG. 1) is heated by the heater 20, the upper cladding (for example, first to third claddings 30a, 30b, and 30c) that covers the core 28 (see FIG. 3) is also heated together. Thus, when the entire upper cladding of the ring resonator 14 is formed by the TEOS film, moisture is gradually released from the TEOS film heated by the heater 20, and the refractive index of the upper cladding decreases. As a result, the resonance wavelength of the ring resonator 14 gradually decreases. For example, a resonance wavelength $\lambda$(T) when the core 28 is maintained at a certain temperature T gradually decreases (for example, shifts to a short wavelength) by heating the upper cladding by the heater 20.

Accordingly, when the wavelength tunable filter 8 is used, the resonance wavelength of the ring resonator 14 shifts to a short wavelength with time. As a result, an oscillation wavelength of the wavelength tunable laser 4 including the two ring resonators 14 also shifts to a short wavelength with time.

Figure 11:
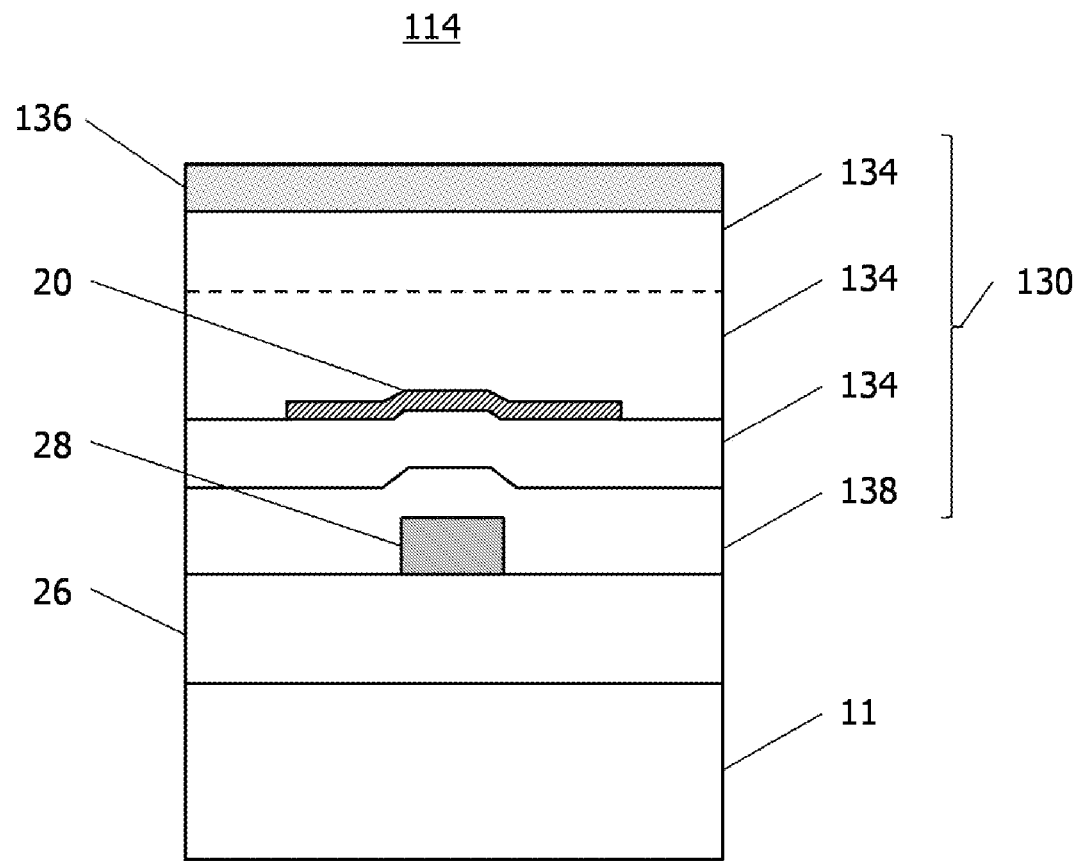
FIG. 11 is a sectional view of a ring resonator in which shift of a resonance wavelength to a short wavelength is suppressed.

FIG. 11 is a sectional view of a ring resonator 114 in which the shift of the resonance wavelength to the short wavelength is suppressed. The ring resonator 114 suppresses the shift of the resonance wavelength to the short wavelength by a high-density silicon oxide film 138 disposed between a TEOS film 134 and the core 28 and a silicon nitride film 136 over a TEOS film 134.

The silicon nitride film 136 is a thin film that is unlikely to transmit moisture than the TEOS film 134. The silicon nitride film 136 corresponds to the passivation film 32 of the optical waveguide 2 (see FIG. 3). The high-density silicon oxide film 138 is a dense thin film (for example, HDP-USG film) that is unlikely to absorb moisture than the TEOS film 134.

The silicon nitride film 136 suppresses absorption of moisture (for example, absorption of moisture in the air) of the TEOS film 134, and the amount of moisture in the vicinity of the core 28 is suppressed by the high-density silicon oxide film 138. Accordingly, since moisture discharged by heating by the heater is hardly present in the ring resonator 114, the resonance wavelength hardly shifts to a short wavelength even though an upper cladding 130 is heated by the heater 20. According to the ring resonator 114 in FIG. 11, the shift of the wavelength itself due to the absorption of the moisture of the TEOS film 134 is also suppressed.

However, the inventor has found that the resonance wavelength of the ring resonator 114 in which the shift of the wavelength to the short wavelength is suppressed gradually shifts to a long wavelength (for example, is lengthened) by heating by the heater for a long period. It is considered that since the shift of the wavelength to the short wavelength is suppressed, the shift of the wavelength to the long wavelength hidden by the shift of the wavelength to the short wavelength becomes apparent.

Figure 12:
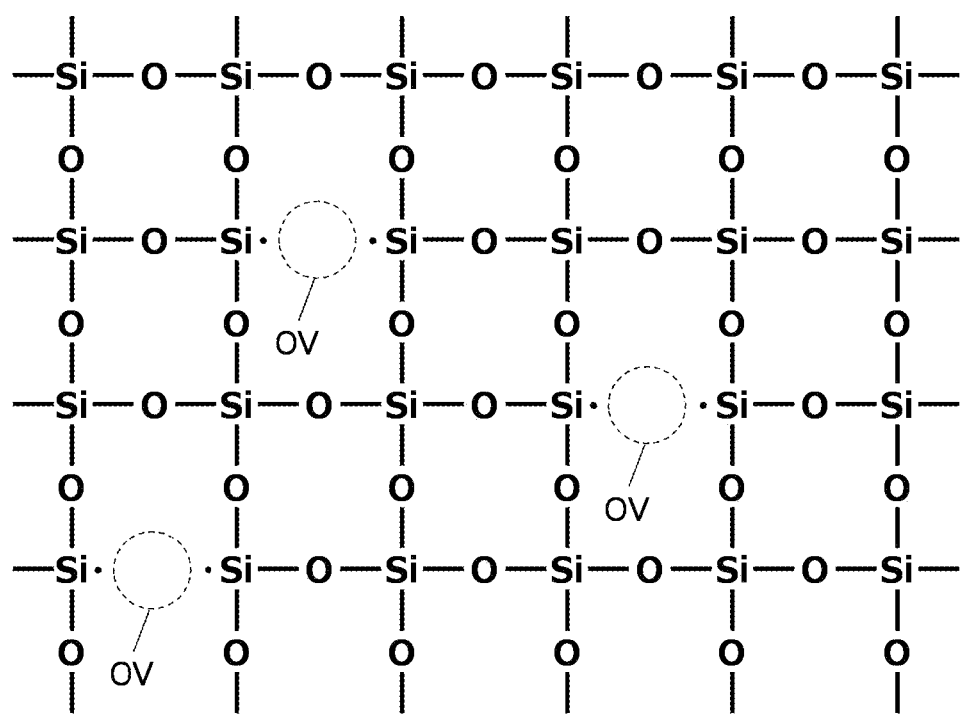
FIG. 12 is a diagram for describing oxygen vacancies in a silicon oxide film.

FIG. 12 is a diagram for describing oxygen vacancies in a silicon oxide film. In the silicon oxide film (for example, TEOS film or HDP-USG film) deposited by the plasma CVD, there are oxygen vacancies OV (for example, oxygen holes) in which oxygen atoms are missing from Si—O—Si bonds.

When the silicon oxide film deposited by the plasma CVD is heated, the oxygen vacancies in the film gradually disappear. The heated silicon oxide film is densified, and as a result, a refractive index of the silicon oxide film increases.

Due to the increase in the refractive index, the resonance wavelength of the ring resonator 114 of which the sectional view is illustrated in FIG. 11 gradually shifts to a long wavelength. Such shift of the resonance wavelength to the long wavelength may be suppressed by heat-treating the high-density silicon oxide film 138 in oxygen before the TEOS film 134 is deposited.

Figure 13:
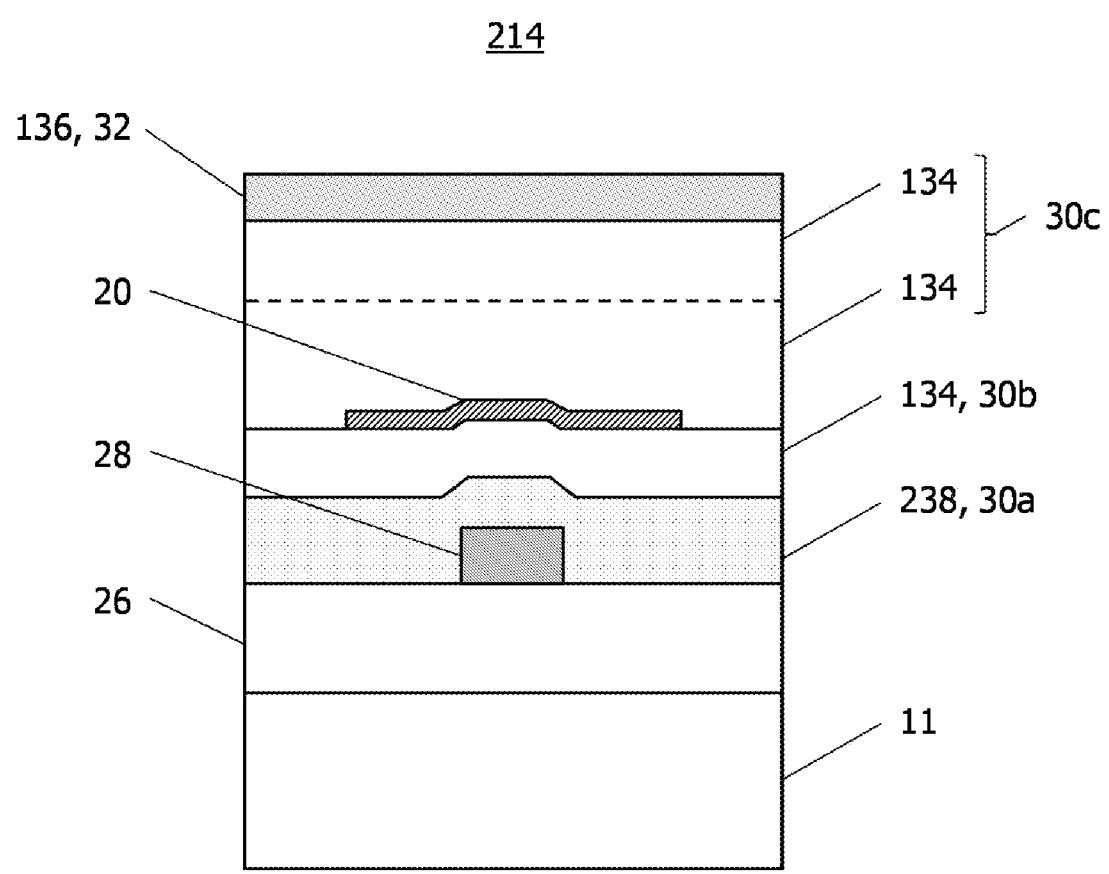
FIG. 13 is a sectional view of a ring resonator including a high-density silicon oxide film heat-treated in oxygen before a TEOS film is deposited.

FIG. 13 is a sectional view of a ring resonator 214 including a high-density silicon oxide film 238 heat-treated in oxygen before the TEOS film 134 is deposited. The ring resonator 214 is an example of the ring resonator 14 described with reference to FIGS. 1 and 3.

When the high-density silicon oxide film 138 (see FIG. 11) is heat-treated in oxygen, oxygen vacancies in the film are significantly reduced. Thus, even though the heat-treated high-density silicon oxide film 238 is heated by the heater 20, since oxygen vacancies are hardly present, an oxygen vacancy density hardly changes. Accordingly, the resonance wavelength of the ring resonator 214 including the high-density silicon oxide film 238 heat-treated in the oxygen hardly shifts to a long wavelength even though the heater 20 is continuously used.

Since the high-density silicon oxide film is inferior in flatness as described in "(2) Manufacturing Method", when the heater 20 is directly formed over the high-density silicon oxide film 238 heat-treated in the oxygen, the heater 20 is likely to be disconnected. In the ring resonator 214 illustrated in FIG. 13, the TEOS film 134 superior in flatness is disposed between the high-density silicon oxide film 238 (see FIG. 13) and the heater 20, and thus, the disconnection of the heater 20 is suppressed.

—Suppression of Fixed Charge Density and Long Wavelength Shift—

The film having the highest oxygen vacancy density among the TEOS film 134, the high-density silicon oxide film 138, and the high-density silicon oxide film 238 heat-treated in the oxygen is the TEOS film 134. The film having the next highest oxygen vacancy density is the high-density silicon oxide film 138. The film having the lowest oxygen vacancy density is the high-density silicon oxide film 238 heat-treated in the oxygen.

The oxygen vacancies in the silicon oxide film are positively charged, and main fixed charges in the silicon oxide film (for example, TEOS film or high-density silicon oxide film) deposited by the plasma CVD are the oxygen vacancies. Accordingly, the fixed charge density in the silicon oxide film changes according to the oxygen vacancy density, and the lower the oxygen vacancy density, the lower the fixed charge density. For example, the fixed charge densities of the TEOS film 134, the high-density silicon oxide film 138, and the high-density silicon oxide film 238 heat-treated in the oxygen decrease in this order. For example, the fixed charge density of the high-density silicon oxide film 238 heat-treated in the oxygen is the lowest. The "fixed charges" are charges in a dielectric film, and are charges that do not move even though an electric field is applied to the dielectric film, unlike a sodium ion or the like.

As described above, the fixed charge density of the first cladding 30a (for example, high-density silicon oxide film 238 heat-treated in the oxygen) according to the first embodiment is lower than the fixed charge density of the second cladding 30b (for example, TEOS film). Accordingly, the oxygen vacancy density of the first cladding 30a according to the first embodiment is lower than the oxygen vacancy density of the second cladding 30b.

As described above, since the oxygen vacancy density of the first cladding 30a according to the first embodiment is lower than the oxygen vacancy density of the second cladding 30b, the oxygen vacancies that disappear in the first cladding 30a by heating by the heater are smaller than the oxygen vacancies that disappear in the second cladding 30b by heating by the heater.

Incidentally, the equivalent refractive index of the optical waveguide is strongly influenced by a refractive index of a region in contact with the core. As illustrated in FIG. 3, since the core 28 of the optical waveguide 2 according to the first embodiment is in contact with the first cladding 30a, the equivalent refractive index of the optical waveguide 2 is strongly influenced by the refractive index of the first cladding 30a.

As described above, the oxygen vacancies that disappear in the first cladding 30a by heating by the heater are smaller than the oxygen vacancies that disappear in the second cladding 30b by heating by the heater. Accordingly, when the first cladding 30a is disposed between the second cladding 30b and the core 28, the oxygen vacancies that disappear in the region in contact with the core 28 decrease. The amount of change in the refractive index due to heating by the heater in the region in contact with the core 28 decreases, and as a result, the amount of change in the equivalent refractive index of the optical waveguide 2 due to heating by the heater also decreases.

As described above, according to the first embodiment, the amount of change in the equivalent refractive index of the optical waveguide 2 decreases by the first cladding 30a of which the fixed charge density is lower than the fixed charge density of the second cladding 30b. Accordingly, according to the first embodiment, a temporal change in element properties (for example, the resonance wavelength of the ring resonator) of the optical device including the optical waveguide with the heater is suppressed. The resonance wavelength of the ring resonator has a length obtained by dividing an optical length (for example, waveguide length×equivalent refractive index) of an optical waveguide forming the ring resonator by an integer.

The fixed charge density of the HDP-USG film heat-treated at 200° C. to 600° C. for 60 minutes in the oxygen is less than $5\times10^{11}$ cm$^{-2}$. The resonance wavelength of the ring resonator 14 having, as the first cladding 30a, the HDP-USG film heat-treated in this manner hardly changes with time. Accordingly, the fixed charge density of the first cladding 30a is preferably less than $5\times10^{11}$ cm$^{-2}$ (see "(1) Structure").

The second cladding 30b is separated from the core 28. Accordingly, the equivalent refractive index of the optical waveguide 2 is unlikely to be influenced by the second cladding 30b. However, when the change in the refractive index of the second cladding 30b is large, the influence of the second cladding 30b on the optical waveguide 2 may not be ignored.

In order to suppress the influence of the second cladding 30b on the optical waveguide 2, the fixed charge density of the second cladding 30b is preferably as low as possible. For example, the fixed charge density of the second cladding 30b is preferably $1\times10^{13}$ cm$^{-2}$ or less (see "(1) structure").

A temporal change of the wavelength locker 10 is to be smaller than a temporal change of the wavelength tunable filter 8. In the wavelength locker 10 according to the first embodiment, the oxygen vacancies in the first cladding 30a that covers the cores 128 (see FIG. 4) are small, and the heater for heating the cores 128 is not provided. Accordingly, according to the first embodiment, the temporal change of the wavelength locker 10 is further smaller than the temporal change of the wavelength tunable filter 8.

(4) Application to Optical Transmission System

Figure 14:
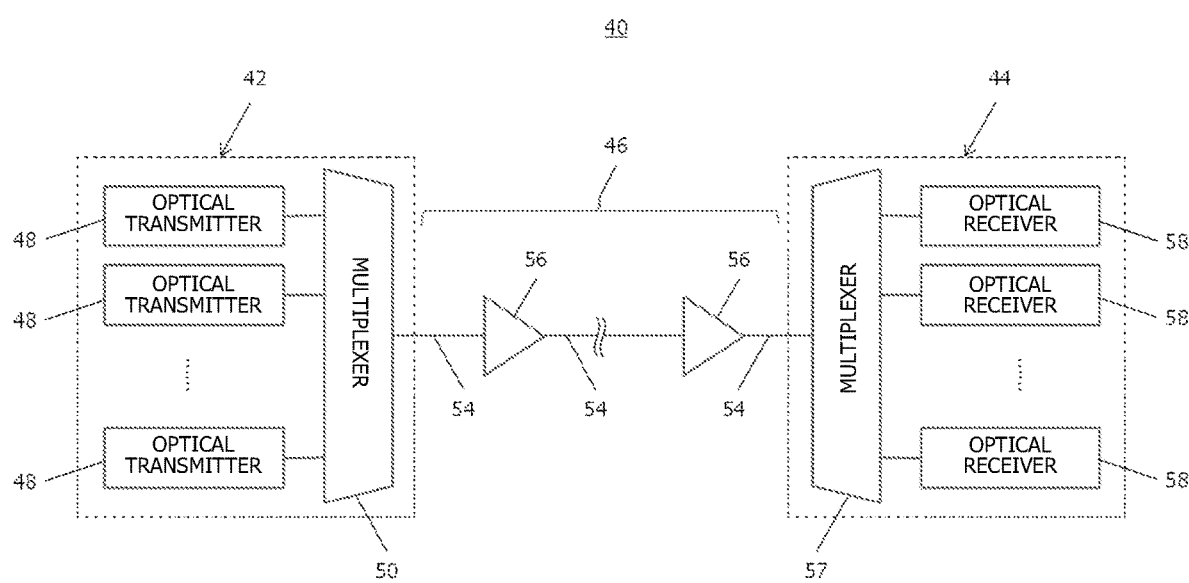
FIG. 14 is a diagram illustrating an example of an optical transmission system to which the wavelength tunable laser in FIG. 1 is applied.

The optical waveguide 2 according to the first embodiment may be applicable to, for example, an optical device for an optical transmission system. The optical waveguide 2 is applied to, for example, the wavelength tunable laser 4 (see FIG. 1) of an optical transceiver. FIG. 14 is a diagram illustrating an example of an optical transmission system 40 to which the wavelength tunable laser 4 in FIG. 1 is applied. The optical transmission system 40 is a system that performs digital coherent optical transmission.

The optical transmission system 40 includes a transmission station 42, a reception station 44, and an optical transmission path 46 that couples the transmission station 42 and the reception station 44 to each other. The transmission station 42 includes a plurality of optical transmitters 48 that outputs individual optical signals having different wavelengths, respectively, and a multiplexer 50 that multiplexes the optical signals output from the plurality of optical transmitters 48. The multiplexer 50 is, for example, a wavelength division multiplexing (WDM) multiplexer.

The optical transmission path 46 includes, for example, a plurality of optical fibers 54 and optical amplifiers 56 disposed between the optical fibers 54. The reception station 44 includes a demultiplexer 57 and a plurality of optical receivers 58 that receives optical signals demultiplexed by the demultiplexer 57 and converts the optical signals into electric signals.

Figure 15:
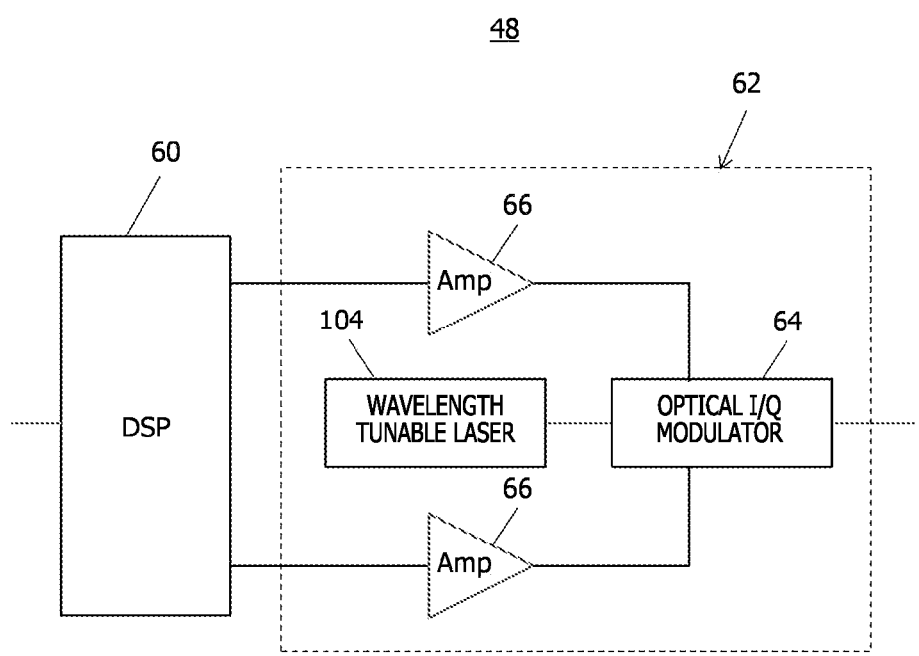
FIG. 15 is a diagram illustrating an example of an optical transmitter.

FIG. 15 is a diagram illustrating an example of the optical transmitter 48. The optical transmitter 48 includes a digital signal processor (DSP) 60 and an optical transmission front-end circuit 62. The optical transmission front-end circuit 62 includes an optical in-phase/quadrature (I/Q) modulator 64, amplifiers 66, and a wavelength tunable laser 104. The wavelength tunable laser 104 is an example of the wavelength tunable laser 4 described with reference to FIG. 1.

The DSP 60 converts an input digital signal into two modulation signals for IQ quadrature modulation. The two modulation signals are output from the DSP 60 and are amplified by the amplifiers 66. The wavelength tunable laser 104 outputs a laser beam having a wavelength assigned to the optical transmitter 48.

The optical I/Q modulator 64 performs quadrature modulation of the laser beam output from the wavelength tunable laser 104 with the modulation signals amplified by the amplifiers 66. The quadrature-modulated laser beam (for example, optical signal) is input to the multiplexer 50 (see FIG. 14). The multiplexer 50 multiplexes the optical signals having different wavelengths output from the plurality of optical transmitters 48 and transmits the multiplexed signal to the reception station 44 via the optical transmission path 46.

Figure 16:
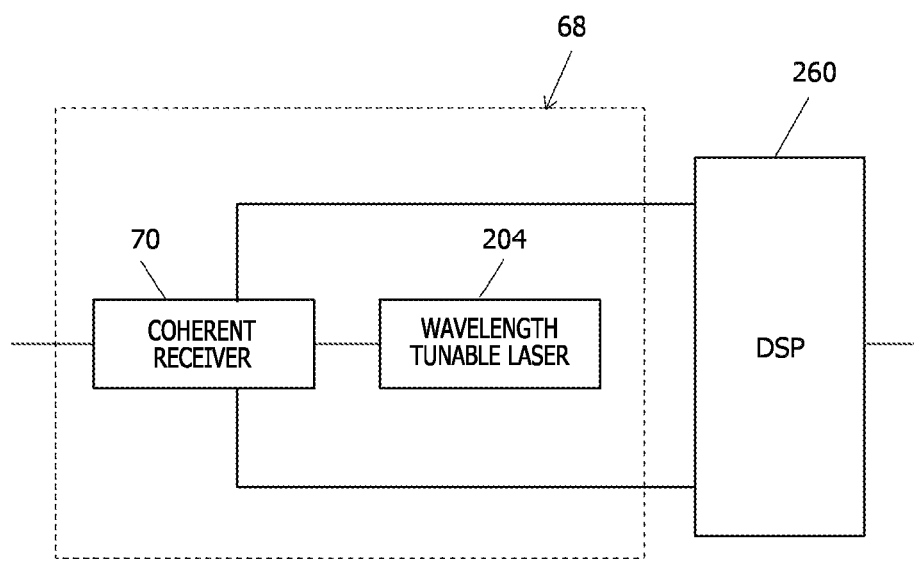
FIG. 16 is a diagram illustrating an example of an optical receiver.

FIG. 16 is a diagram illustrating an example of the optical receiver 58 (see FIG. 14). The optical receiver 58 includes an optical reception front-end circuit 68 and a DSP 260. The optical reception front-end circuit 68 includes a coherent receiver 70 and a wavelength tunable laser 204. The wavelength tunable laser 204 outputs a laser beam having a wavelength assigned to the optical receiver 58. The wavelength tunable laser 204 is an example of the wavelength tunable laser 4 described with reference to FIG. 1.

The demultiplexer 57 of the reception station 44 (see FIG. 14) demultiplexes the WDM signal input from the optical transmission path 46 (for example, the plurality of optical signals multiplexed by the multiplexer 50) into individual optical signals, and inputs the optical signals to the optical receiver 58.

The coherent receiver 70 (see FIG. 16) of the optical receiver 58 mixes the optical signals input by the demultiplexer 57 with the laser beam output from the wavelength tunable laser 204 to generate four interference light beams having phases different from each other by 90°.

The coherent receiver 70 photoelectrically converts the generated four interference light beams into two electric signals by two balance receivers (not illustrated). The DSP 260 regenerates the digital signal input to the DSP 60 of the optical transmitter 48 from the two electric signals obtained by the photoelectric conversion. As described above, the optical transmission system 40 transmits the digital signal from the transmission station 42 to the reception station 44.

As described above, in the first embodiment, since the first cladding 30a of which the fixed charge density lower than the fixed charge density of the second cladding 30b is disposed between the core 28 and the second cladding 30b of the optical waveguide 2 with the heater, the oxygen vacancy density in the region in contact with the core 28 decreases. As a result, a layer that is unlikely to be influenced by heating by the heater, which causes the oxygen vacancies to disappear to change the refractive index, is formed in the region in contact with the optical waveguide 2. Accordingly, according to the first embodiment, the temporal change in the element properties (for example, the resonance wavelength of the ring resonator) of the optical device including the optical waveguide with the heater may be suppressed.

In the first embodiment, the flatness of the second cladding 30b in which the heater 20 is mounted is higher than the flatness of the first cladding 30a in contact with the core 28. Accordingly, according to the first embodiment, since the flatness of the base of the heater 20 is improved, the heater 20 is unlikely to be disconnected, and as a result, the reliability of the heater 20 increases.

Second Embodiment

Figure 17:
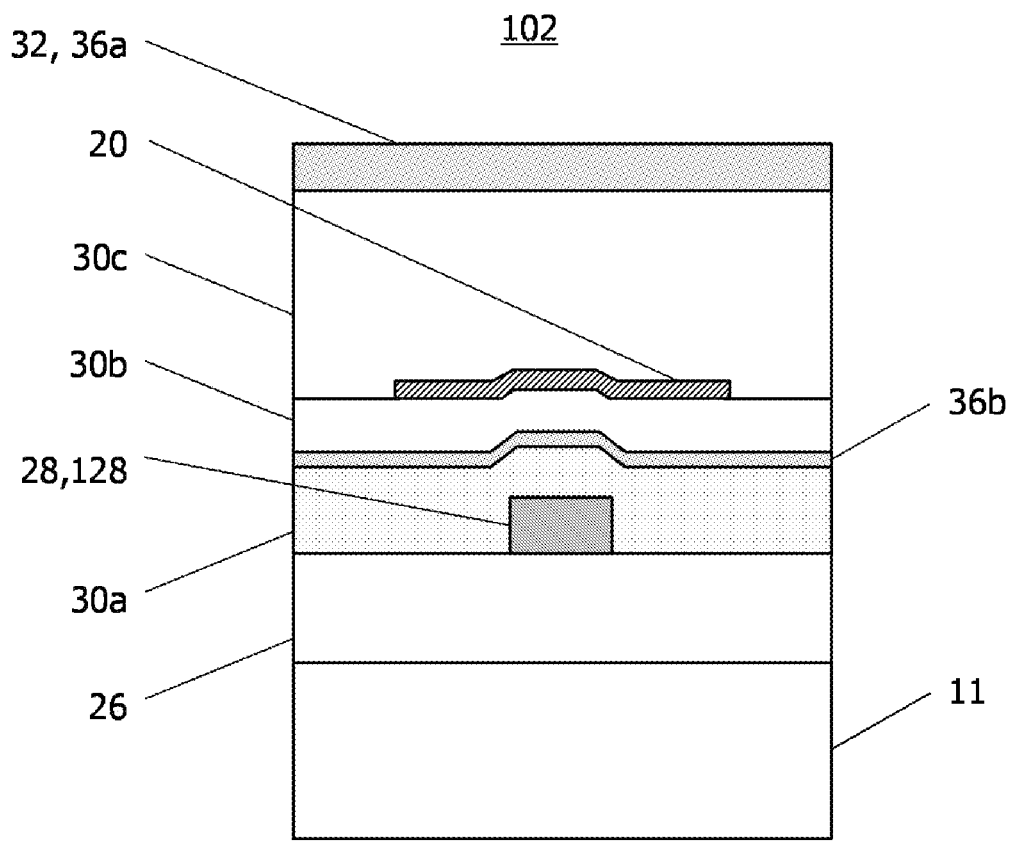
FIG. 17 is a diagram illustrating an example of a sectional view of an optical waveguide according to a second embodiment.

FIG. 17 is a diagram illustrating an example of a sectional view of an optical waveguide 102 according to a second embodiment. As illustrated in FIG. 17, the optical waveguide 102 according to the second embodiment is similar to the optical waveguide 2 according to the first embodiment described with reference to FIG. 3 and the like.

However, the optical waveguide 102 includes a silicon nitride film 36b (hereinafter, referred to as a second silicon nitride film) that covers the core 28 in plan view between the first cladding 30a and the second cladding 30b. A structure of the optical waveguide 102 is substantially identical to the structure of the optical waveguide 2 according to the first embodiment except that the second silicon nitride film 36b is provided. Accordingly, the description of the structure and the like identical to as the structure of the optical waveguide 2 according to the first embodiment will be omitted or simplified.

As described in the first embodiment, the silicon nitride film is a thin film that is unlikely to transmit moisture. The second silicon nitride film 36b is provided in the optical waveguide 102, and thus, diffusion of moisture from the second cladding 30b to the first cladding 30a in contact with the core 28 may be suppressed. Accordingly, according to the second embodiment, the shift of the resonance wavelength to the short wavelength suppressed by the first silicon nitride film 36a (see "(3) Suppression of Temporal Change" in the first embodiment) may be further suppressed.

Figure 6A:
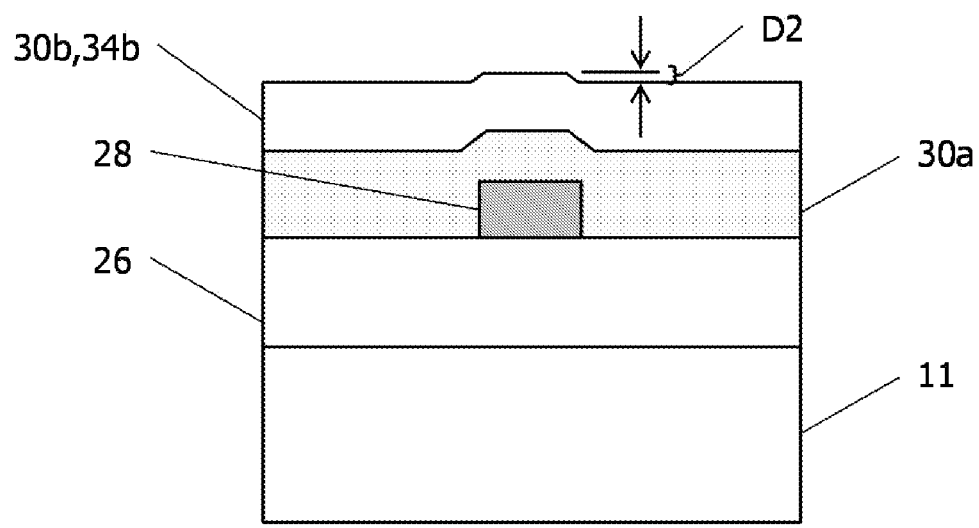
FIGS. 6A and 6B are diagrams illustrating an example of the method for manufacturing the optical waveguide.
Figure 6B:
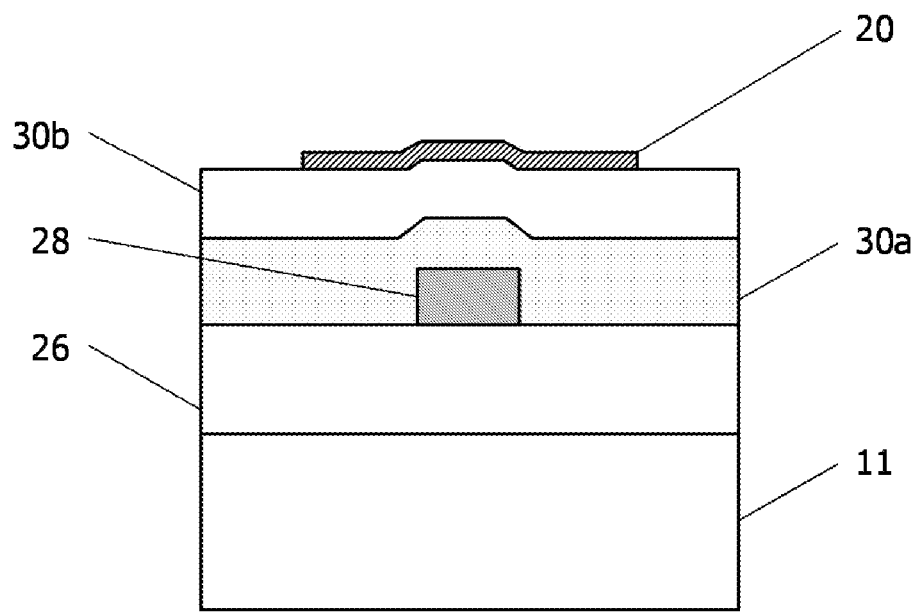

The optical waveguide 102 may be manufactured by forming the second silicon nitride film 36b over the first cladding 30a before the second silicon oxide film 34b is formed (see FIG. 6A). The second silicon nitride film 36b may be processed by the photolithography and the RIE so as to cover only the ring resonator 14.

According to the second embodiment, since the diffusion of the moisture from the second cladding 30b to the first cladding 30a may be suppressed by the second silicon nitride film 36b, the temporal change in element properties (for example, the resonance wavelength of the ring resonator) of the optical device including the optical waveguide with the heater may be further suppressed.

Although the embodiments of the present disclosure have been described above, the first and second embodiments are illustrative and are not restrictive. For example, in the first embodiment, the third cladding 30c is covered with the first silicon nitride film 36a. However, the third cladding 30c may be covered with another passivation film (for example, alumina film) instead of the silicon nitride film.

When the optical device including the optical waveguide 2 is housed in a container filled with dry nitrogen or the like, since the upper cladding does not absorb humidity, the third cladding 30c may not be covered with the silicon nitride film.

In the first embodiment, the level difference of the second cladding 30b is lower than the level difference of the first cladding 30a. However, the level difference of the second cladding 30b may be approximately equal to the level difference of the first cladding 30a. Even in such a case, when a film thickness of the heater 20 is sufficiently thick, the disconnection of the heater 20 may be suppressed.

The optical waveguide 2 according to the first embodiment is included in the wavelength tunable laser. However, the optical waveguide 2 may be included in an optical device other than the wavelength tunable laser. For example, the optical waveguide 2 may be included in a Mach-Zehnder type optical switch or a phase adjuster.

The core 28 according to the first embodiment is made of silicon. However, the core 28 may be formed of a material other than silicon. For example, the core 28 may be composed of InP or InGaAsP.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide comprising:
a core;
a first cladding configured to cover the core;
a second cladding disposed over the first cladding;
a heater disposed over the second cladding to heat the core;
a third cladding configured to cover the second cladding and the heater; and
a first silicon nitride film disposed over the third cladding,
wherein the first cladding and the second cladding are silicon oxide films, and a first fixed charge density of the first cladding is lower than a second fixed charge density of the second cladding.

2. The optical waveguide according to claim 1,
wherein the first fixed charge density is less than $5 \times 10^{11}$ cm$^{-2}$, and
the second fixed charge density is $1 \times 10^{13}$ cm$^{-2}$ or less.

3. The optical waveguide according to claim 1, further comprising:
a second silicon nitride film configured to cover the core in plan view between the first cladding and the second cladding.

4. The optical waveguide according to claim 1,
wherein a second level difference which is positioned above the core is lower than a first level difference which is positioned above the core, and
the second level difference is a level difference on a surface of the second cladding close to the heater, and
the first level difference is a level difference on a surface of the first cladding close to the heater.

5. The optical waveguide according to claim 1,
wherein the core is an annular semiconductor layer, and
the core is included in a ring resonator that resonates light having a particular wavelength which travels around the core.

6. The optical waveguide according to claim 1,
wherein the first cladding further covers another core different from the core,
the second cladding covers the another core via the first cladding, and
when light intensity of output light output from the another core changes periodically with respect to a wavelength of input light input to the different core and the wavelength is a particular wavelength, the different core, the first cladding, and the second cladding are included in a wavelength locker in which the light intensity becomes maximal.

7. An optical device comprising:
a wavelength tunable laser configured to output a laser light; and
a modulator configured to modulate the laser light, wherein
the wavelength tunable laser includes an optical waveguide, the optical waveguide includes:
a first cladding configured to cover the core,
a second cladding disposed over the first cladding,
a heater disposed over the second cladding to heat the core,
a third cladding configured to cover the second cladding and the heater, and
a first silicon nitride film disposed over the third cladding,
wherein the first cladding and the second cladding are silicon oxide films, and a first fixed charge density of the first cladding is lower than a second fixed charge density of the second cladding.

8. An optical device comprising:
a wavelength tunable laser configured to output a laser light; and
a receiver configured to receive an optical signal and generate an interference by mixing the optical signal and laser light, wherein
the wavelength tunable laser includes an optical waveguide, the optical waveguide includes:
a first cladding configured to cover the core,
a second cladding disposed over the first cladding,
a heater disposed over the second cladding to heat the core,
a third cladding configured to cover the second cladding and the heater, and
a first silicon nitride film disposed over the third cladding,
wherein the first cladding and the second cladding are silicon oxide films, and a first fixed charge density of the first cladding is lower than a second fixed charge density of the second cladding.

* * * * *